(12) United States Patent
Deter (10) Patent No.: US 6,262,781 B1
(45) Date of Patent: *Jul. 17, 2001

(54) VIDEO PROJECTION APPARATUS AND METHOD OF DISPLAYING A VIDEO IMAGE COMPOSED OF PIXELS OF A DEFINED SIZE

(75) Inventor: Christhard Deter, Gera (DE)

(73) Assignee: LTD GmbH & Co. Laser-Display-Technologie KG, Gera (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,115
(22) PCT Filed: May 30, 1997
(86) PCT No.: PCT/EP97/02813
  § 371 Date: Feb. 18, 1998
  § 102(e) Date: Feb. 18, 1998
(87) PCT Pub. No.: WO98/05161
  PCT Pub. Date: Feb. 5, 1998

(30) Foreign Application Priority Data

Jul. 19, 1996 (DE) ............................................. 196 29 279

(51) Int. Cl.⁷ ..................................................... H04N 5/14
(52) U.S. Cl. .......................... 348/744; 348/759; 359/202; 359/196
(58) Field of Search ................................... 348/750, 756, 348/758, 195–205, 759, 760–762, 769; 359/196, 201, 202, 290, 846; H04N 5/74

(56) References Cited

U.S. PATENT DOCUMENTS 4,003,080 * 1/1977 Maiman et al. ....................... 348/196
4,639,073    1/1987 Yip et al. .
5,274,492 * 12/1993 Razzaghi .............................. 359/202

(List continued on next page.)

FOREIGN PATENT DOCUMENTS 4324849   7/1993 (DE) .
4306797   5/1994 (DE) .
44 32 029 3/1996 (DE) .

(List continued on next page.)

OTHER PUBLICATIONS

**2 English language Abstracts of Russian documents 1838892 and 1568263.
Article about Laser TV published in the German Journal; Radio, Fernsehen Elektronik RFE, vol. 9, 1995; pp. 40 and 41.

(List continued on next page.)

Primary Examiner—Michael Lee
(74) Attorney, Agent, or Firm—Reed Smith LLP (57) ABSTRACT

In a video projection device for showing a video picture composed of picture points of defined magnitude on a screen with at least one light source for emitting a light bundle with a predetermined beam profile for illuminating every picture point on the screen during a predetermined time interval, it is provided that the beam profile of the light bundle is expanded wider than the defined magnitude of the respective picture point to be illuminated and the time interval is so short that the magnitude of the picture point recognized in the eye of an observer watching the video picture is perceptible in conformity with the defined size of the picture point. A method, in which a video picture on a screen is formed of picture points in that a light bundle with a predetermined beam profile is directed onto the screen for the illumination, in each instance, of a picture point of defined size for a predetermined time interval, is characterized in that a light bundle with a beam profile which is expanded further than those by means of the defined size of the picture point to be illuminated is used in the method, and every picture point is illuminated within a time interval which is short enough that the magnitude of the picture point recognized in the eye of an observer watching the video picture is perceived in conformity with the defined size of this picture point.

16 Claims, 4 Drawing Sheets

U.S. PATENT DOCUMENTS

| | | |
|---|---|---|
| 5,499,061 | 3/1996 | Oku . |
| 5,889,612 * | 3/1999 | Van De Ven ............... 359/453 |
| 5,920,361 * | 7/1999 | Gibeau et al. ............... 348/750 |
| 6,002,505 * | 12/1999 | Kraenert et al. ............... 359/196 |

FOREIGN PATENT DOCUMENTS

| | | |
|---|---|---|
| 1568263 | 4/1988 | (RU) . |
| 1838892 | 6/1990 | (RU) . |
| WO9115923 | 10/1991 | (WO) . |

OTHER PUBLICATIONS

Patent Abstracts of Japan, vol. 014, No. 409 (P–1101), Sep. 5, 1990, Publication No. 02–157790, Jun. 18, 1990 (Hitachi Ltd.).

Electronic Design, vol. 43, Nr. 21, pp. 37–38, (XP000551878)Oct. 12, 1995 "Laser–Based TV Under Development Promises Sharper and High–Resolution Images".

* cited by examiner

VIDEO PROJECTION APPARATUS AND METHOD OF DISPLAYING A VIDEO IMAGE COMPOSED OF PIXELS OF A DEFINED SIZE

BACKGROUND OF THE INVENTION a) Field of the Invention

The invention is directed to a video projection device for showing a video picture composed of picture points of defined magnitude on a screen with at least one light source for emitting a light bundle with a predetermined beam cross section or beam profile for illuminating every picture point on the screen during a predetermined time interval. The invention is further directed to a method in which a video picture on a screen is constructed of picture points in that a light bundle with a predetermined beam profile is directed onto a screen to illuminate every picture point of defined magnitude during a predetermined time interval.

b) Description of the Related Art

Since its discovery, video and television technology has captured a considerable market in an impressive manner. Within a period of one year, approximately 60 million television sets are produced worldwide.

More recent developments have substantially improved picture quality with respect to sharpness, contrast and brilliance of color.

Above all, the picture reproducing element is decisive for picture sharpness. In television picture tubes, aperture masks or shadow masks, as they are called, are used to sharply delimit the individual pixels. The first task performed by these masks for displaying color is to separate the regions accessible to the three utilized electron beams for the phosphors on the screen to produce red, green and blue light. Secondly, a sharp framing or delimiting of the picture points is also effected by the aperture masks in the formation of a video picture. When a television picture tube is observed from a very short distance, the human eye can detect a pixel structure that is given by the localization of the picture points (pixels).

There are other methods for showing a video picture besides television picture tubes. Some of these methods make use of the projection of a primary image internal to the device. In so doing, the primary image is magnified on a screen by means of a projection lens.

Without doubt, the most commonly used apparatus of this type is the LCD projector. The primary image to be projected is formed by means of a liquid crystal matrix (LCD matrix). This liquid crystal matrix presents a fixed quantity of picture points, one LCD element being provided for each picture point. The division of the LCD matrix into individual LCD elements is clearly discernible on the projection screen especially as a result of the outer contour of the individual LCD elements.

The pixel structure is clearly discernible in a video projection device, likewise in a device proposed by Texas Instruments with tiltable mirrors for the illumination of picture points by means of the edges of the individual mirrors.

In image projection with "beamers", as they are called, the front surface of a television picture tube is projected onto a projection screen. In this case, again, the individual picture points are framed by the formation of the mask structure of the individual picture tubes.

In all of the methods mentioned above, the number of individual picture elements available for displaying picture points for constructing a video picture is determined by the construction of the corresponding picture reproduction systems. For this reason, these systems are generally only suitable for one television standard only. For example, a PAL television picture tube has 625×830 picture elements that are used for showing the picture points of a video system.

In the PAL display with liquid crystal matrices, the same quantity of LCD elements is required, just as the aforementioned mirror system must have the same number of mirrors.

Therefore, there is one inherent disadvantage in all of these systems. If a single picture element fails, the picture quality declines appreciably. Owing to the aforementioned large number of picture elements for showing the picture points, it is estimated that the probability for failure of a single picture element is very high.

This problem becomes even more relevant with regard to improving picture quality by means of an increased quantity of picture points, as is the aim in the HDTV standard, for example, in which approximately 3 million picture elements are necessary in any case. The high probability of failure has disadvantageous consequences above all in the aforementioned matrix with tilting mirrors by Texas Instruments. The development of this equipment has not yet yielded a marketable video device because the rejection quota is much too high.

Further, the techniques mentioned above have the drawback that video pictures can be displayed in only one standard. It is not possible to modify the displayable picture format, since, for example, the aspect ratios are also determined by the fixed standard.

The dimensions of a picture element can be determined in a simple manner from the picture format and the corresponding number of picture elements. These magnitudes vary between different standards. Accordingly, there can be no multivalent use of different standards and systems.

These disadvantages are overcome in the prior art according to the generic type. Such systems are known, for example, from DE 43 06 797 C1. According to this reference, a light bundle is deflected in a raster pattern on a screen, wherein the light intensity or light color of the deflected light bundle is modulated in a manner similar to that of the deflected electron beam in a picture tube for controlling a picture point.

Due to the raster scanning, every picture point is illuminated by the light bundle for only a short time in fractions of microseconds. In principle, the picture is first formed in the eye of the observer which, because of its inertia, averages the received light information over a period of more than $\frac{1}{100}$ second.

In these systems, there exists no internal picture within a projector. Picture elements delimited by physical apertures are not required in principle.

The size of a picture point is substantially determined by the diameter of the light bundle for illuminating the individual picture points. Therefore, because of the high degree of parallelism of the light, lasers are generally used for video projection devices of this type. In principle, LEDs, which are considerably cheaper than lasers, could also be used. However, the cost of parallelizing optics and increased output to compensate for light losses due to diaphragms and collimators would have to be taken into account.

There are firmly defined values for determining a spot illuminated by a laser. Since the intensity profile of the laser beam can generally be approximated by a Gaussian function and thus has no sharp boundary, the diameter is generally defined by a drop in intensity to $1/e^2$ with reference to the intensity maximum.

High quality must be preserved in the propagation conditions of the laser beam in order to achieve a required resolution demanded on the basis of the picture point size of a standard. The quality can be improved through the use of optical systems for beam focussing. In so doing, the outlay for optical equipment for achieving the required laser focus increases disproportionately with the resolution.

OBJECT AND SUMMARY OF THE INVENTION

The ordinary object of the invention is to provide a video projection system and a method enabling a more economical display of a video picture with respect to a defined picture point size for the light sources generating the light bundle or with respect to the optical systems.

Proceeding from the generic prior art, this object is met in that the beam profile of the light bundle is expanded wider than the defined magnitude of the respective picture point to be illuminated and the time interval is so short that the magnitude of the picture point recognized in the eye of an observer watching the video picture is perceptible in conformity with the defined size of the picture point.

As was already stated above, the light bundle would presumably have to have the same size on the screen as the picture point to be illuminated. But, surprisingly, it has turned out that, because of the temporary exposure of the visual receptors in the eye of an observer, a briefly generated spot of light on a screen is perceived as a light point having a substantially smaller diameter.

This result is incomprehensible at first glance. But if it is considered that, based on the described principle for the illumination of an individual picture point with a million picture points per picture, the light intensity in the eye is approximately a million times greater than if every visual receptor were statically illuminated, it will be seen that the visual receptors in the eye of the observer in this type of picture acquisition are operating in a mismatched range compared with static vision.

However, this would still not explain why the diameter of a light bundle appears smaller than it actually is. On the contrary, it would be expected, based on an analogy to the behavior of conventional amplifiers in the field of electrical engineering, that the visual receptors in the eye of the observer would be essentially overdriven, so that the diameter detected by the eye would be substantially greater than the result of the drop in light intensity of $1/e^2$. However, such a conclusion would not be correct, as was determined by experiments. This may be because the visual receptors are readily capable of adapting to differences in intensity in the order of magnitude of $10^4$ so that, physiologically, no overdriving similar to electronic light-sensitive components is to be anticipated.

However, the observed phenomenon is also not easily explainable on the basis of the attainable dynamics in visual receptors. Two model views which make plausible the smaller visually detected light spot diameter will be indicated hereinafter with reference to embodiment examples.

Irrespective of an explanation for this phenomenon, it nevertheless allows a more economical solution to the problem upon which the invention is based with respect to the video projection device of the generic type. Tests conducted with a laser projection system showed that at conventional raster scanning speeds corresponding to the PAL standard at the picture point size defined by this standard and at the given predetermined time interval for illuminating every picture point, beam profiles can be used whose diameter defined by the $1/e^2$ drop in the intensity maximum of the laser light bundle can even be four times as great as the statically detectable beam diameter expected for compliance with the standard. It is evident from the preceding that the expenditure on optical systems or the expenditure required for light sources is substantially lower than it would be if a focus corresponding exactly to the picture point size were used.

The detected phenomenon can also be utilized in vector graphics. However, the effect is advantageously used with the most nearly identical time intervals per picture point. For this purpose, an advantageous further development of the invention provides a raster scanning device for line-by-line, left-to-right, top-to-bottom raster scanning by which a defined line spacing is maintained during the raster scanning.

The aforementioned number four was determined in a specific construction of a video device. As will be clear from consideration of physiological model calculations hereinafter, the observed effect can even be used with substantially larger beam diameters, because in this way it becomes plausible to expect that the diameter of the bundle could even be as much as ten times the desired picture point size. Accordingly, an advantageous further development of the invention is characterized in that a width which is defined in the vertical direction relative to the line-by-line raster scanning over a $1/e^2$ drop in intensity from the maximum is associated with the beam profile, this width ranging between one and ten times the defined line spacing.

In this further development, a line-by-line raster scanning is taken into account and the beam diameter is related to the line spacing. The line spacing is determined via the standard used in each case substantially better than is the picture point size. Therefore, indication of a line spacing is also suitable for defining the beam diameter. However, the further development advantageously takes into account the fact that the beam diameter can be up to ten times the line spacing.

However, it is also true in this case that the laser focus should be as low as possible for a high-quality resolution. For this reason, in preferred further developments of the invention, the width of the beam profile is between one and five times the line spacing and, in particular, the ratio of the width of the beam profile to the line spacing is 4±1.

As was already made clear above, the underlying effect enabled by the invention is difficult to understand. It would seem, however, that the effect comes about in that every picture point and thus, indirectly, every visual receptor with which the video picture is detected is illuminated only very briefly. In order to magnify the effect, it is suggested in another advantageous further development of the invention that the light source is pulsed and, in particular, is a pulsed laser.

Considerations presented hereinafter will make it clear that the effect is brought about particularly well if the pulse duration is less than 1 µs, especially less than 10 ps. A still better use of this effect is achieved in another preferred further development of the invention in that every picture point is illuminated with a pulse duration of less than 1 ps.

Proceeding from the generic prior art, a method according to the invention is characterized in that a light bundle with a beam profile which is expanded further than those by means of the defined size of the picture point to be illuminated is used in the method, and every picture point is illuminated within a time interval which is short enough that the magnitude of the picture point recognized in the eye of an observer watching the video picture is perceived in conformity with the defined size of this picture point.

Also, the method makes use of the response or behavior of the eye of the observer detected in the arrangement. The picture point imaged by the beam bundle is thus substantially larger than the picture point which is to be displayed and which is given by the respective standard. Because of the physiological characteristics of the eye, the larger spot of light is perceived with a diameter which corresponds to the required picture point size.

The method and the arrangement according to the invention can be used for purposes other than showing raster scanned video pictures. For example, it is also known for show applications to carry out deflections for displaying vector graphics. For this purpose, a light bundle for every picture is guided along a curve to be displayed.

As was already stated above, the time response is important in the method according to the invention. For this reason, care should be exercised with respect to vector graphics that every surface element is illuminated substantially within identical time intervals. As is known in vector graphics in show applications, however, longer times can occur per path length at corner points. This can be particularly bothersome for display in show applications. In order to prevent this, appropriate electronic apparatus can also be used to ensure that short time intervals are maintained also for exposure at corner points in vector graphics.

However, an image display in which all picture points are uniformly illuminated in principle is less costly. Accordingly, a preferred further development of the invention provides that the light bundle is raster scanned for displaying the video picture.

As was already described above, the physiological effect under consideration can be enhanced when the time intervals for displaying picture points are reduced. In a preferred further development of the invention, this is achieved in that the light bundle is pulsed during illumination of every picture point.

The invention is explained in more detail hereinafter by way of example with reference to the drawings and a model calculation.

DESCRIPTION OF THE PREFERRED EMBODIMENTS

Figure 1:
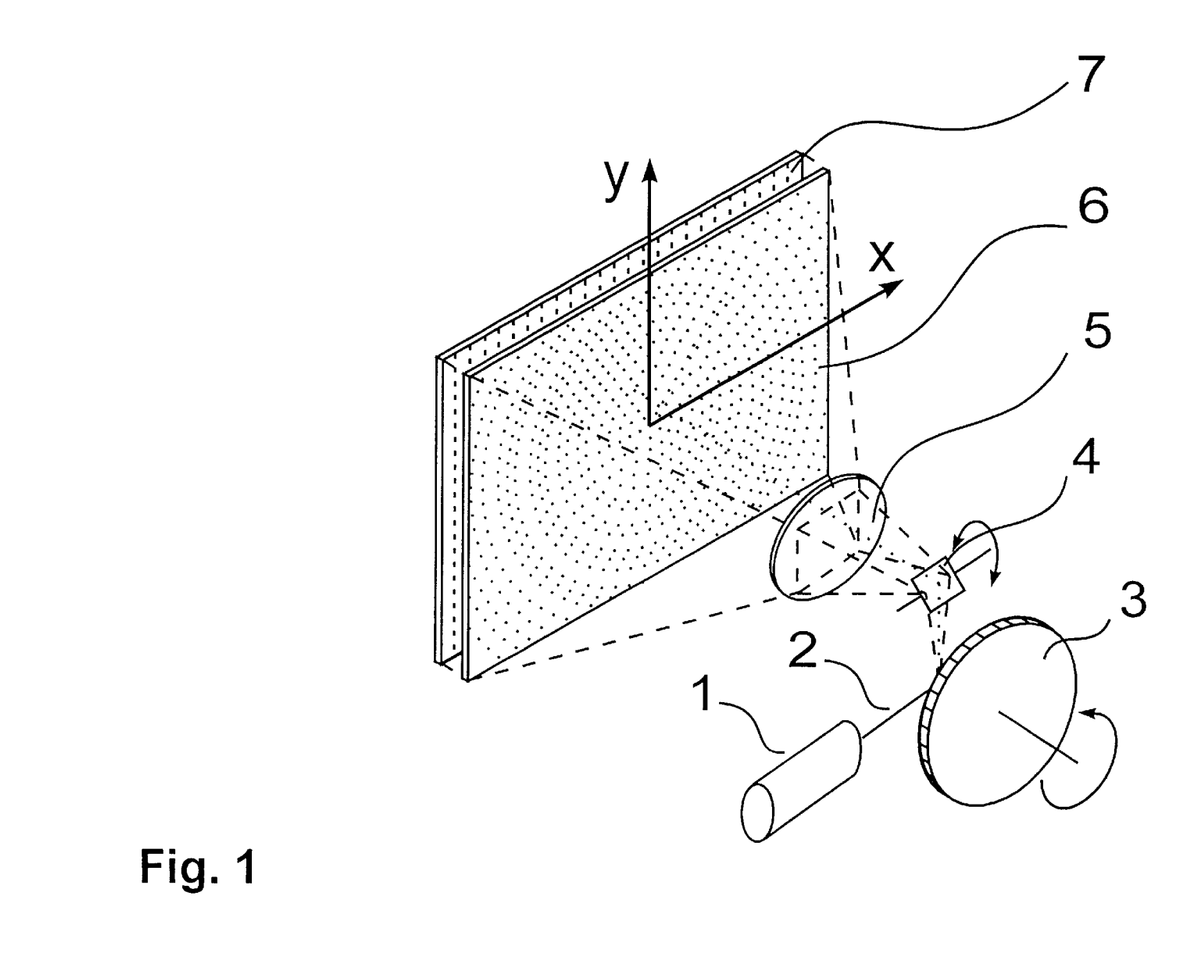
FIG. 1 is a schematic view of an embodiment example.

FIG. 1 shows a video device such as that known from the generic prior art, but which has been constructed in accordance with the present invention.

A modulated light source 1 is provided for brightness modulation, an intensity-modulated light bundle 2 emanating therefrom. This light bundle impinges on a polygon mirror 3 and a swivel mirror 4.

The polygon mirror 3 and the swivel mirror 4 together form a raster scanning arrangement which raster scans the light bundle in a uniform manner with respect to frame frequency and line frequency in accordance with a video standard. In comparison to the known Braun tube in television technology, the light bundle 2 corresponds to the electron beam and the polygon mirror 3 and swivel mirror 4 to the magnetic coils for deflecting the electron beam. The modulation of the light bundle 2, deflection and synchronization are effected in a manner analogous to television technique with picture tubes, so that further explanation is unnecessary.

After the scanning deflection by means of the polygon mirror 3 and swivel mirror 4, the light bundle 2 passes an optical system 5. This optical system 5 is designed for magnifying the attainable picture size. Further, it serves to reduce the focus of the light bundle 2. In the embodiment example, an optical system 5 such as that known from DE 43 24 849 C2 is used. This is essentially an afocal lens system which, in a known manner, simultaneously causes a decrease in focus while increasing the angle.

Subsequently, the light bundle 2 impinges on a Fresnel lens 6 by means of which the light bundle is parallelized and which ensures that the light bundle 2 occupies the same angle relative to the following screen 7 regardless of the location of the respective picture point being shown. The Fresnel lens 6 serves to ensure a uniform illumination density over the entire rastered screen 7.

The screen 7 is constructed as a diffusion screen. By means of the diffusion screen, the light is scattered in a solid angle region predetermined by its characteristic so that the video picture generated by this device can be detected regardless of the angle occupied by the observer relative to the screen.

In the embodiment example, raster scanning was effected in accordance with the PAL standard, so that every picture point is illuminated only within a time interval of less than 1 µs. In so doing, it has turned out, surprisingly, that the light bundle emanating from the screen 7 may be expanded substantially further than is required for the picture point size defined for the video standard. Assuming a Gaussian beam profile for the light bundle 2 and letting the beam width be defined by the flanks of the $1/e^2$ drop from the maximum, it is evident that this width could even amount to four times the picture diameter without a noticeable decrease in picture sharpness. This characteristic turns out to be especially advantageous, since the optical system 5 or the light source 1 can therefore be constructed in a substantially more economical manner while nevertheless achieving the desired picture point size. However, if the raster scanning arrangement were stopped so that a static light point was imaged on the screen 7, an increased picture point size would also be observed, as is also expected statically based on the layout of the optical system 5 and light source 1.

The substantially smaller observed beam diameter is attributable to the physiology of the eye. Another contributing factor is the brief exposure of individual visual receptors instead of uniform exposure which supplies a stimulus in normal observation of a picture, so that the picture point size appears substantially smaller than the width of the light bundle 2. The effect used in this case is explainable by observations discussed hereinafter with reference to FIGS. 2 to 4.

Figure 2:
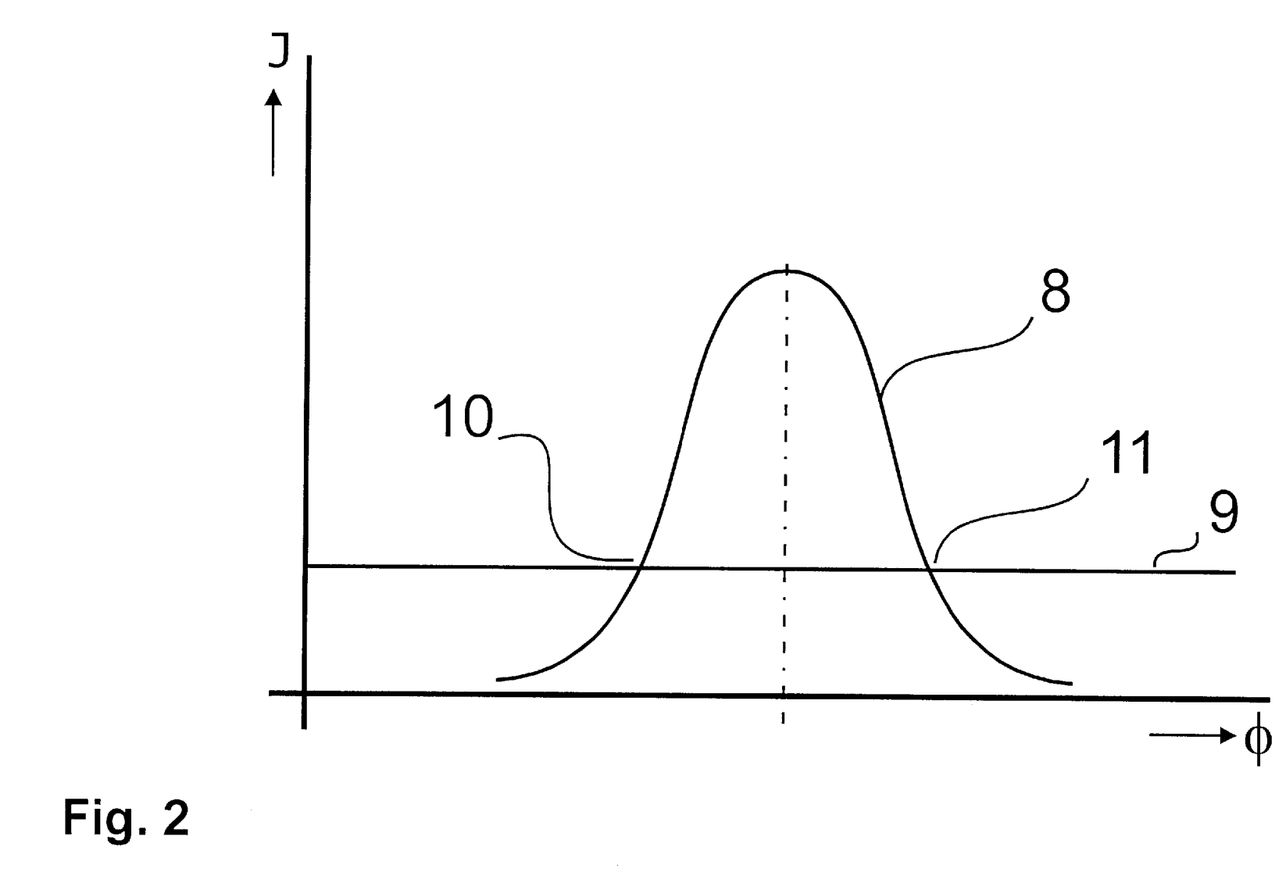
FIG. 2 shows an intensity profile of a light bundle on a diffusion screen.

In FIG. 2, the intensity curve 8 of a light bundle is shown in a meridional section. The distance Φ from the point of maximum intensity is shown on the abscissa, while the ordinate shows the intensity J of the intensity curve 8.

After the light bundle 2 passes through the screen 7, which is constructed as a diffusion screen, the scattered laser light enters the half-space in front of the diffusion screen.

Figure 3:
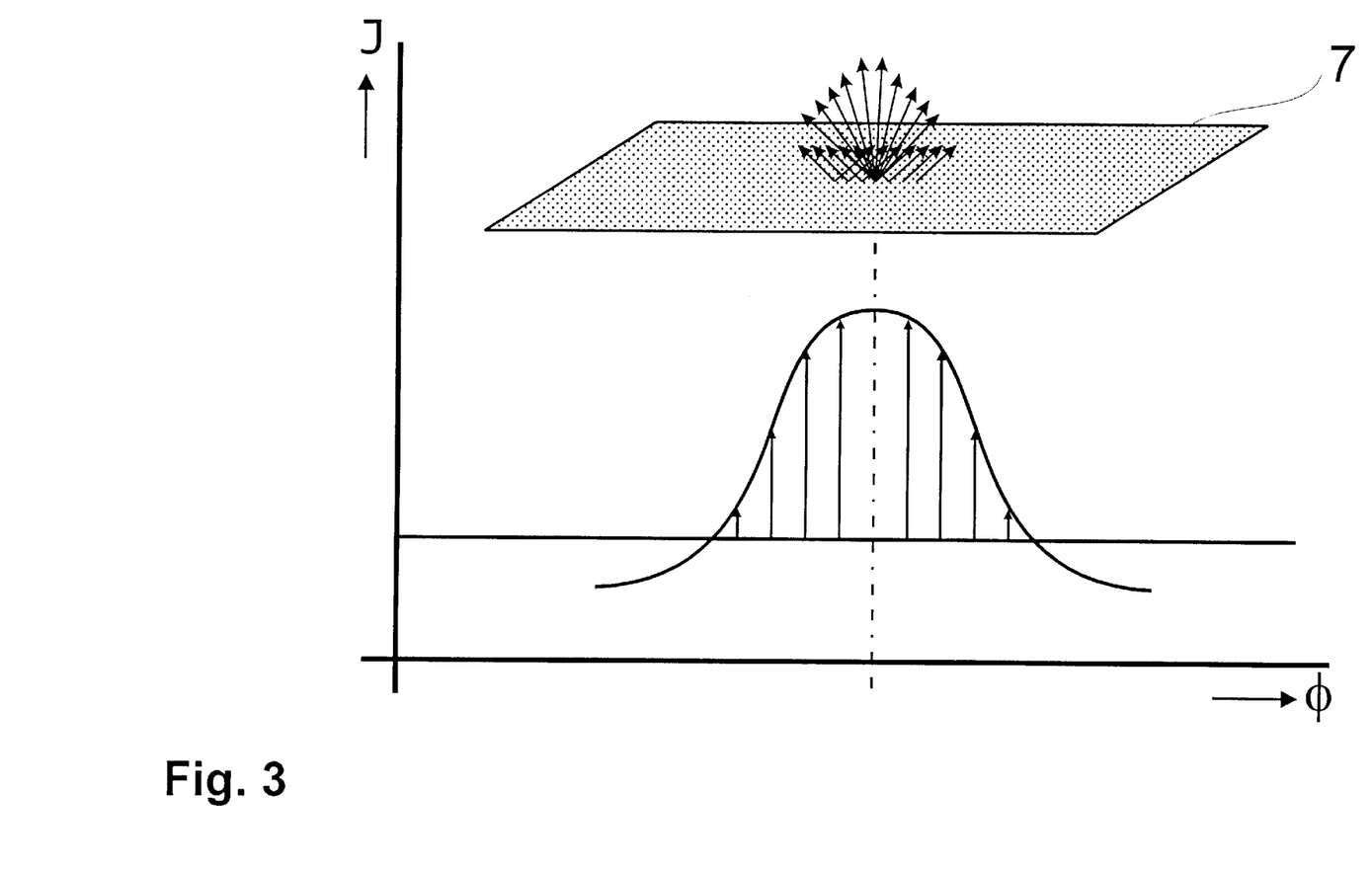
FIG. 3 is a schematic view of the perceptible diameter of the light bundle with increased threshold.

This is shown schematically in FIG. 3. A plurality of scattering centers are formed due to the scattering structure of the screen 7 which contains microscopic scattering particles. Every scattering center emits scattered light as an autonomous point light source. Thus, scattering centers which emit light with varying intensity result over the intensity profile of the laser beam.

The intensity curve 8 achieves smaller values at the edges of the profile of the light bundle. Since the diffusion screen, apart from its scattering characteristic, is colored black for the purpose of increasing contrast, a certain portion of light is absorbed. The diameter of the visible laser profile is accordingly delimited.

FIG. 2 shows the limiting absorption level as a straight line 9 parallel to the Φ-axis. The points 10 and 11 of the straight line 9 intersecting with the intensity curve 8 determine the detectable intensity based on the absorption of the diffusion screen. The distance between the intersecting points 10 and 11 represents the diameter of the laser beam which is imaged in the screen 7 by means of the scattering centers. These relationships hold true objectively without evaluation by human sense of sight as well as in the static case.

However, as can be seen from FIG. 2, for example, the two points 11 and 12 determining the diameter of the light bundle would move closer together if the straight line 9 were located at higher intensity.

The human eye is generally capable of detecting dynamic ranges in the order of magnitude of $10^4$. This is related to the nonlinear sensitivity of the visual receptors on one hand, but also to the possibility of accommodation through change in pupil size. Due to the inertia of the eye with a time constant of approximately 1/30s, the pupil size that is adjusted during the video projection is the same as it would be if the entire light intensity within this time interval determining the inertia impinged on the visual receptor. In fact, however, the intensity in every picture point is instantaneously approximately $10^5$ times greater (picture point frequency greater than several megahertz) because of the reduced exposure time. Thus, the eye of the observer is not correctly adapted to these high intensities. This means that the visual threshold at which the eye still detects the correct intensities is not in the optimum range compared with natural sight as it exists, e.g., in the static case. The observation in the embodiment example of FIG. 1 that a beam diameter sensed by the eye is substantially smaller than the actual diameter of the light bundle 2 clearly points to the fact that the threshold determined by the mismatch is substantially higher than in normal vision.

This is illustrated in FIG. 4 which again shows a Gaussian curve in the J-Φ graph. The straight line drawn in this graph lies in the vicinity of the maximum of the Gaussian curve, so that the width between points 12 and 13 appears substantially smaller than in the static case given in FIG. 2.

Figure 4:
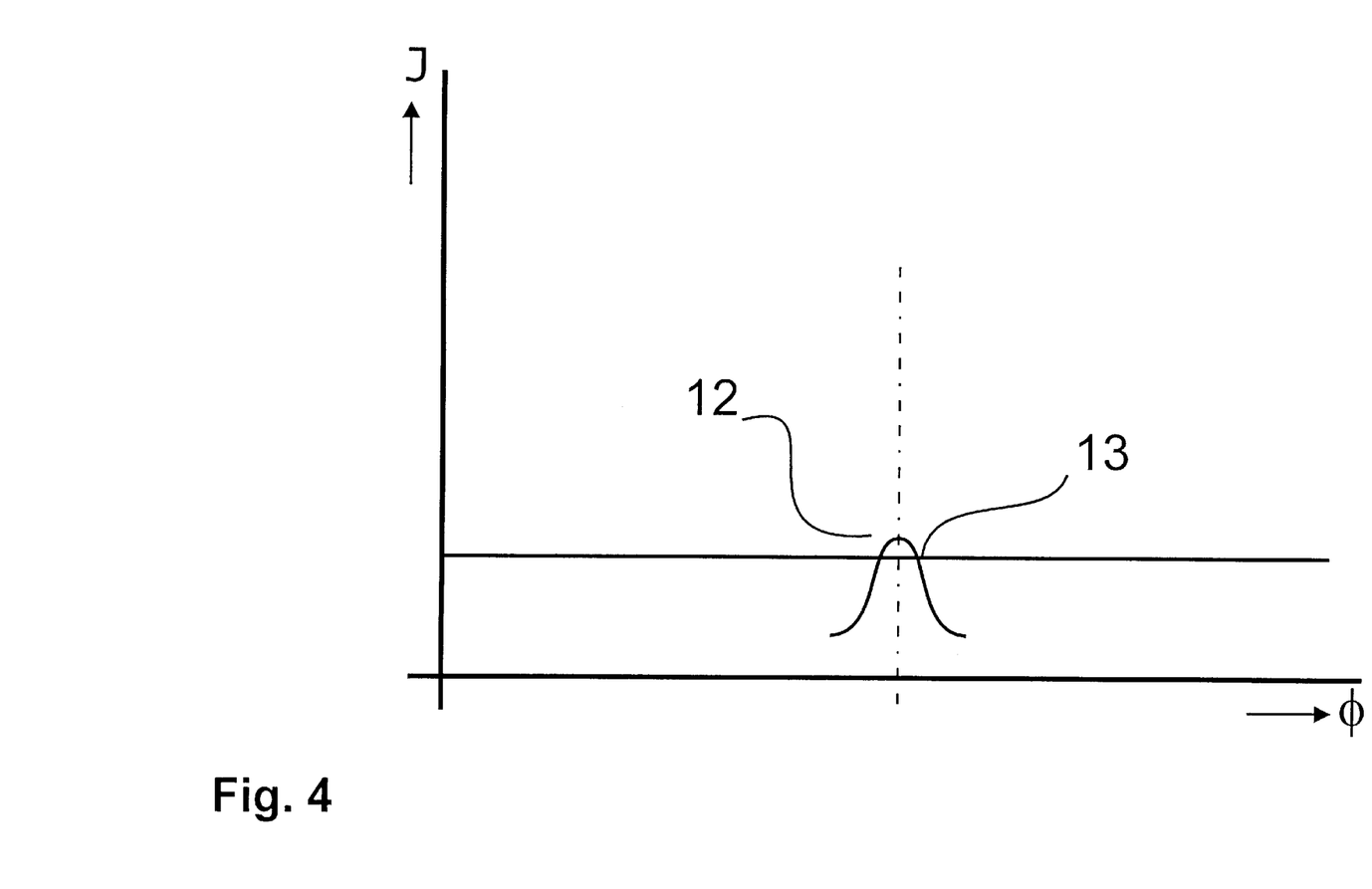
FIG. 4 shows a model illustration of the physiology of the eye based on the understanding gained in FIG. 2 and FIG. 3.

Naturally, the example shown in FIG. 4 does not take into account the nonlinear character of physiological phenomena. Everyone knows from personal experience that good vision is possible in profound darkness as well as in the brightest sunlight. Thus, highly dynamic ranges can be detected by the eye and even slight differences in brightness in harsh light can be detected.

Similar behavior is also known with respect to the human ear. In terms of technology, this behavior is accounted for in loudness or volume by the selection of a logarithmic scale (indicated in dB's).

A logarithmic behavior would be postulated in an analogous manner for stimulation of an optic nerve. A logarithmic stimulus behavior is also useful so that the nerve paths are able at all to transmit high dynamics up to $10^6$.

Thus, the following equation can be posited for nerve stimulus R to explain the observed phenomenon:

$$R=F*\ln I/I_0,$$

where I represents the light intensity, $I_0$ represents the threshold of the visual receptor adapted to the respective light conditions, F represents a factor which is adjusted, among others, by the pupil for optimum control of stimulus R.

On the other hand, contrasts which are highly damped in a logarithm are also well discerned. This means that a function for perception should at least reverse the stimulus function shown or even increase the contrast. Therefore, an exponential behavior must be postulated correspondingly for perception W:

$$W=ke^R$$

Negligible variables which might possibly enter into perception W and which have no significance as concerns the following considerations are omitted in this simplified model. However, a factor k has also been added so that perception W can always be correctly normalized to stimulus R.

In the static case in which the perception function represents the actual intensity or the actual intensity course, a functional relationship must be assumed between k, F and $I_0$. Especially in the case of gradual changes in I, it is necessary to prepare a formulation for every optional course I regardless of location, which is expressed as:

$$k=I_0 \text{ and } F=1,$$

so that the correct intensity is always perceived.

Further, a relationship between the variables f, k and $I_0$ is similarly assumed in the dynamic case. Although very fast changes in I with respect to time are no longer perceptible, the intensity is averaged over time by the inertia of the eye. The intensity is given by an adaptation or accommodation of the eyes in which the average is equal to the intensity to be perceived correctly. Therefore, a functional relationship is expected between f, k and $I_0$ in which the time integral over I is equal to the time integral over W, wherein the integration range is to be selected in the order of magnitude of the time constants for the inertia of the eye.

It will be determined in the following with the help of the equations given above how a Gaussian profile describing the intensity distribution in the light bundle is perceived. The beam profile is correspondingly described as:

$$I=e^{-x^2/2\sigma^2},$$

where x is the distance to the center and σ is the variance. Normally, a width is indicated for such beam profiles in that those in which the intensity decreases from a maximum to $e^{-2}$ are designated by x. In this case, this means that the value x defined in this way equals 2σ. Thus, the width which is defined more fully above corresponds to four times the variance.

When this intensity distribution is used in the equations given above for stimulus and for perception, the following equation results:

$$W=ke^{-Fx^2/2\sigma^2}/I_0^F.$$

As will be seen from a comparison with the beam profile of I, the light intensity is perceived with a variance $\sigma/\sqrt{F}$. Thus, in the static case, in which F=1, the beam profile is seen in a true-to-life manner as expected. However, as was stated above, F is determined by the size of the pupil among other things, so that it is expected that F≠1 because of the expected mismatch described above.

The pupil is open substantially wider in a time interval of microseconds than in static vision. Normal time constants for changing the size of the pupil lie in the order of magnitude of several seconds, so that in the dynamic case the value of F is exaggerated compared with the static case; that is, the perceived beam profile is substantially narrower than that of the light bundle briefly impinging on the visual receptors.

A simple estimation can also be indicated for F. Since the visual receptors are illuminated within time constants in the range of less than 1 μs and the eye inertia is in the range of 1/30 s, the stimulation compared with general static stimulations of the visual receptor is more than $10^5$ times greater. On the other hand, visual receptors can detect a dynamic range of $10^4$. Thus, the estimation can proceed from the fact that the eye has usually accommodated by the middle of this permissible dynamic range ($10^2$), so that an exaggeration of $10^7$ can be taken as a point of departure for $I/I_0$. This means that the factor F is too large by a factor ln ($I/I_0$). The factor F is then approximately 16, that is, the perceived width of the Gaussian function which appears smaller by √F as was shown above is narrower than the projected light bundle by a factor of 4.

This simple estimation added to the results also confirmed by experimentation is proof of the interpretation that a physiological effect takes place in this instance. The fact that, in spite of the rather crude estimate, values similar to those observed in the calculation are obtained is certainly to be attributed to the fact that, above all else, the logarithm enters into this consideration; that is, small erroneous estimates have little influence.

However, the present Applicant knows of no measurements which show a logarithmic behavior between stimulus and light intensity even at magnitudes of $10^7$. Therefore, the model mentioned above must be viewed as simplified and still in need of improvement in essential details.

However, as was made clear from the preceding considerations, it is essential in order to achieve the physiological effect that the instantaneous intensity be as high as possible. This effect can be augmented in that very high intensities are introduced to the visual receptor as briefly as possible. For this reason, the use of a pulsed laser also presents the best way to increase the effect. As was made clear, a factor greater than four is expected in the range of 1 μs to 10 ps pulse times. At smaller pulse durations of even less than 1 ps, a perceived beam width which is still substantially smaller compared with the width of the light bundle 2 should be able to be used for improvement according to the model calculations presented above. Based on these considerations and possibly further based on deviations in the logarithmic behavior of the stimulus function, imaging conditions can be selected in which beam diameters up to ten times the picture point size to be shown are used. However, under normal conditions, such as when preserving a standard with picture point times of more than 100 ps, only a beam diameter in the range from one to five times can be realized. This is confirmed by test results for 4. On the other hand, since the definition of the beam profile is determined only by approximation and a deviation of the picture point size of 20% with respect to the picture point size is tolerable as regards quality, the invention can be realized chiefly in the range of the ratio of the width of the beam profile to the line spacing in the range of 4±1.

The appropriate limits can easily be determined by experimentation by a person skilled in the art with the given exposure times for the individual picture point.

While the foregoing description and drawings represent the present invention, it will be obvious to those skilled in the art that various changes may be made therein without departing from the true spirit and scope of the present invention.

What is claimed is:

1. In a video projection device for showing a video picture composed of picture points of a size which is defined by the size of the video picture and by a selected video standard, on a screen with at least one light source for emitting a light bundle with a predetermined beam profile, an improvement comprising:

said at least one light source emitting said light bundle is adapted to generate a single picture point by illuminating a portion of said screen corresponding to said single picture point during a predetermined time interval, said light bundle being adapted to scan over said screen to generate every picture point;

said beam profile of the light bundle for generating said single picture point set such that the illuminated portion of said screen corresponding to the respective picture point to be generated is greater than the defined size of the respective picture point to be generated and the time interval for illuminating the portion of said screen corresponding to said respective picture point to be generated being sufficiently short so that the size of the picture point recognized in an eye of an observer watching the video picture is perceptible in conformity with the size of the picture point as defined by the size of the video picture and said selected video standard.

2. The video projection device according to claim 1, wherein a raster scanning device is provided for line-by-line, left-to-right, top-to-bottom raster scanning of the light bundle for generating a single picture point, by which a defined line spacing is maintained during the raster scanning.

3. The video projection device according to claim 2, wherein a width which is defined in the vertical direction relative to the line-by-line raster scanning over a $1/e^2$ drop in intensity from the maximum is associated with the beam profile, this width ranging from one to ten times the defined line spacing.

4. The video projection device according to claim 3, wherein the width of the beam profile is between one and five times the line spacing.

5. The video projection device according to claim 4, wherein the ratio of the width of the beam profile to the line spacing is 4±1.

6. The video projection device according to claim 1, wherein that the light source is pulsed.

7. The video projection device according to claim 6, wherein the pulse duration is less than 1 μs.

8. The video projection device according to claim 7, wherein the pulse duration is less than 1 ps.

9. A method in which a video picture composed of picture points of a size which is defined by the size of the video picture and by a selected video standard is formed on a screen, comprising the steps of;

directing a light bundle for generating a single picture point onto a portion of said screen corresponding to said single picture point for illuminating said portion during a predetermined time interval, scanning said light bundle having a predetermined beam profile over said screen to generate every picture point;

using said light bundle for generating one single picture point with said beam profile which is set wider than the defined size of the picture point to be generated so that the illuminated portion of said screen corresponding to the picture point to be generated is greater than the defined size of the picture point to be generated; and illuminating said portion of said screen corresponding to said picture point to be generated within a time interval sufficiently short so that the size of the picture point recognized in an eye of an observer watching the video picture is perceived in conformity with the size of this picture point as defined by the size of the video picture and said selected video standard.

10. The method according to claim 9, including the step of raster scanning the light bundle for generating one single picture point to display the video picture.

11. The method according to claim 9, including the step of pulsing the light bundle for generating one single picture point when illuminating every picture point.

12. The video projection device according to claim 6, wherein the light source is a pulsed laser.

13. The video projection device according to claim 7, wherein the pulse duration is less than 10 ps.

14. The video projection device according to claim 12, wherein the pulse duration is less than 10 ps.

15. The video projection device according to claim 13, wherein the pulse duration is less than 1 ps.

16. The video projection device according to claim 14, wherein the pulse duration is less than 1 ps.

* * * * *